United States Patent [19]
Masarik et al.

[11] Patent Number: 5,517,192
[45] Date of Patent: May 14, 1996

[54] HIGH RESOLUTION GAIN RESPONSE CORRECTION CIRCUIT

[75] Inventors: David M. Masarik, Laguna Beach; Robert S. Hayes, Lawndale, both of Calif.

[73] Assignee: Hughes Aircraft Company, Los Angeles, Calif.

[21] Appl. No.: 319,382

[22] Filed: Oct. 5, 1994

[51] Int. Cl.$^6$ ..................................................... H03M 1/18
[52] U.S. Cl. ............................................................. 341/139
[58] Field of Search ........................... 341/139, 120, 341/118, 144; 330/2, 129

[56] References Cited

U.S. PATENT DOCUMENTS

| | | | |
|---|---|---|---|
| 4,806,914 | 2/1989 | Thomas et al. | 340/680 |
| 4,891,645 | 1/1990 | Lewis et al. | 341/154 |
| 5,381,148 | 1/1995 | Muecke et al. | 341/139 |

Primary Examiner—Brian K. Young
Attorney, Agent, or Firm—M. W. Sales; W. K. Denson-Low

[57] ABSTRACT

A high resolution gain response correction circuit. The inventive circuit (10) is adapted for use with a first circuit for providing a first analog input signal and includes a second circuit ($R_p$, $R_{ref}$) for providing a second input signal in response to the first input signal. A third circuit (12) is included for providing an analog output signal in response to the first and second input signals. In a particular implementation, the third circuit is a digital-to-analog converter (12). The digital-to-analog converter (12) is adapted to adjust the output signal level in response to an individual pixel correction reference signal. A digital potentiometer ($R_p$) allows for the first input signal to be scaled and used to adjust the level of the second input signal. By adjusting the setting of the potentiometer, the dynamic range of the output to the digital-to-analog converter may be adjusted. Hence, the inventive arrangement allows for the gain correction range of a digital-to-analog converter to be matched to a particular array under test via software control.

9 Claims, 2 Drawing Sheets

HIGH RESOLUTION GAIN RESPONSE CORRECTION CIRCUIT

BACKGROUND OF THE INVENTION

1. Field of the Invention

The present invention relates to signal processing circuits and systems. More specifically, the present invention relates to circuits and systems for providing automatic gain and offset control.

2. Description of the Related Art

Night vision systems are well known in the art. Night vision systems typically include a cryogenically cooled linear detector array with an associated cryogenic subsystem, a scanning system which moves an image across a two-dimensional array, and a refractive optical system which focuses energy onto the detector. The detectors in the array either sense the heat of a body or detect low light levels.

While these systems have been used for military applications, the high cost of the scanning and cooling of the array and the optical systems associated therewith has heretofore limited the applicability of same for numerous other applications. Accordingly, there has been a need in the art for a low cost night vision system.

U.S. patent application Ser. No. 08/232,893, entitled "LOW COST NIGHT VISION CAMERA" Apr. 12, 1994 by S. H. Klapper et al., the teachings of which are incorporated herein by reference, discloses and claims a low cost camera for night vision systems including a focal plane array of uncooled detectors and an optically fast, optical arrangement for focusing energy onto the array. The array may include a plurality of pyroelectric detectors which in the illustrative embodiment are fabricated of barium-strontium-titanate material. Each pixel in the array is associated with a unique detector.

Unfortunately, the characteristics and therefore the output of each detector is unique with respect to sensitivity, gain and DC offsets. U.S. patent application Ser. No. 08/226,796 filed Apr. 12, 1994, the teachings of which are incorporated herein by reference, discloses and claims a signal processing circuit which provides automatic gain and offset control for an array of BST detectors. U.S. patent application Ser. No. 08/226,588 filed Apr. 12, 1994, the teachings of which are incorporated herein by reference, discloses and claims a digital signal processing circuit which provides automatic offset and global gain control for an array of pyroelectric detectors.

These references provide a teaching as to how to correct for sensitivity and gain variations for individual detectors in the array. Correction of gain and sensitivity variation on a detector by detector basis is effected by exposing the array to a uniform warm reference pattern and storing the outputs of the detectors in memory. In operation, the stored values are converted to analog form by a digital-to-analog converter (DAC) and used to adjust a reference input for a multiplier. In operation, a signal from a given detector is multiplied by this unique stored gain correction parameter to effect the gain adjustment.

However, the range of gain adjustments required across one array may differ considerably from the range of adjustments required across another array. That is, gain correction across one array might vary from 0.5 to 1.5, while the gain correction variation across another array may vary from 0.9 to 1.1. Hence, one array may require the full dynamic range of the DAC, while another may require only a portion of same. This leads to an underutilization of the dynamic range of the DAC for certain arrays and an associated suboptimum performance. Digital-to-analog converters are typically expensive devices relative to other components in the system and these devices often set the dominant parameters of system performance. Full utilization of the dynamic range of a DAC allows a full utilization of the resolution of the device. (In this context, the term "resolution" means the extent to which the device can discriminate between input signals that are close in amplitude or digital code and provide corresponding output signals which are widely spaced.) Increases in correction resolution allow for the use of low cost digital-to-analog converters.

Accordingly, a need remains in the art for a system and technique for providing an optimum utilization of the full dynamic range of the an digital-to-analog converter.

SUMMARY OF THE INVENTION

The need in the art is addressed by the present invention which provides a high resolution gain response correction circuit. The inventive circuit is adapted for use with a first circuit for providing a first analog input signal and includes a second circuit for providing a second input signal in response to the first input signal. A third circuit is included for providing an analog output signal in response to the first and second input signals.

In a particular implementation, the third circuit is a digital-to-analog converter. The digital-to analog-converter is adapted to adjust the output signal level in response to an individual pixel correction reference signal. A digital potentiometer allows for the first input signal to be scaled and used to adjust the level of the second input signal. By adjusting the setting of the potentiometer, the dynamic range of the output of the DAC may be adjusted. Hence, the inventive arrangement allows for the gain correction range of a digital-to-analog converter to be matched to a particular array under test via software control.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
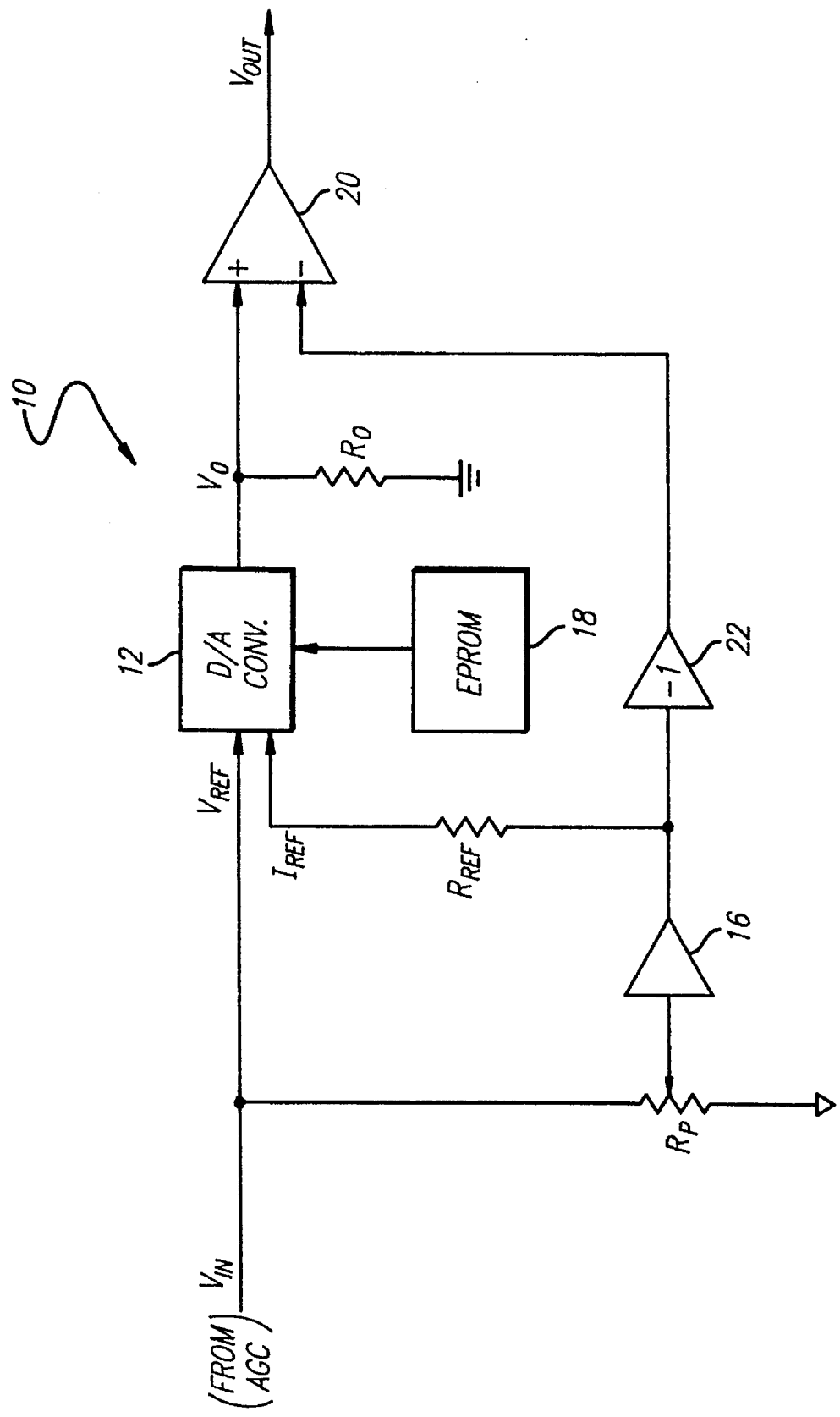
FIG. 1 is a block diagram of an illustrative implementation of the gain correction circuit of the present invention.

FIG. 1 is a block diagram of an illustrative implementation of the gain correction circuit of the present invention. The inventive circuit 10 includes a conventional digital-to-analog converter 12 which receives a first analog input signal ($V_{in}$) from a circuit such as an automatic gain control circuit (not shown). ($V_{in}$ is the voltage representing global gain as required by the automatic gain control loop.) In accordance with the present teachings, the first input signal $V_{in}$ is supplied to a first terminal of a conventional digital potentiometer. The second terminal of the digital potentiometer is connected to ground. The output terminal of the digital potentiometer is connected to a unity gain buffer amplifier 16. The setting on the wiper of the potentiometer may be set under software control.

The output of the unity gain amplifier 16 is connected to a first terminal of a resistor $R_{ref}$. The second terminal of the resistor $R_{ref}$ is connected to a second input terminal of the DAC 12. A digital pixel correction signal is provided to the DAC by a memory such as an electrically erasable programmable read-only memory (EPROM). The output of the DAC is a first input to a differential amplifier 20. The DAC output signal is developed across an output resistor $R_o$ which has its second terminal connected to ground. A second input to the differential amplifier 20 is provided by the output of an inverter 22. The inverter 22 receives input from the output of the buffer amplifier 16.

The advantageous operation of the invention is best appreciated with an examination of the operation of a conventional DAC input circuit by which the second input terminal is connected through resistor $R_{ref}$ to ground. In this configuration, the output of the DAC $V_o$ is:

$$V_o = I_o \times R_o \qquad [1]$$

If the pixel correction value (n) supplied by the EPROM 18 is maximum, e.g., n = 255, then:

$$I_o = K \times I_{ref} \qquad [2]$$

and $$V_o = K \times I_{ref} \times R_o \qquad [3]$$

where, $I_o$ is the DAC output current, $V_o$ is the DAC output voltage, $I_{ref}$ is the current at the second terminal of DAC and K is a constant for the DAC.

For $0 \leq n \leq 255$, $$V_o = K I_{ref} R_o (n/255) \qquad [4]$$

When the other end of $R_{ref}$ is grounded:

$$I_{ref} = V_{ref}/R_{ref} \qquad [5]$$

so:

$$V_o = K \times V_{ref} R_o/R_{ref} (n/255) \qquad [6]$$

Selecting $R_{ref}$, $R_o$ and K so that the expression $KR_o/R_{ref}$ becomes unity, e.g., $R_{ref} = 3{,}200$ ohms, $R_o = 200$ ohms, $K = 16$:

$$\begin{aligned} V_o &= V_{ref} \cdot 16 \times 200/3200 \cdot n/255 \\ &= V_{ref} \cdot n/255 \end{aligned} \qquad [7]$$

where n is the individual pixel gain correction factor, typically a number n between 0 and 255.

In accordance with the present teachings, $R_{ref}$ is not connected to ground. In this case, $I_{ref}$ is less than $V_{ref}/R_{ref}$. When $R_{ref}$ is not connected to ground, $V_o$ is reduced by a factor "y" which is the fractional setting of the range scale potentiometer $R_p$. The parameter "y" represents the lower limit of the gain control range and is a number between zero and one.

With $R_{ref}$ not being returned to ground, the voltage at the second terminal of the DAC 12 is equal to the voltage across the resistor $R_{ref}$ added to the voltage at the other end of the resistor. However, the voltage across the resistor $R_{ref}$ is equal to the net current flowing through the resistor ($I_{ref}$) times the resistance of the resistor ($R_{ref}$). The DAC 12 will adjust current out of the second terminal as necessary to make the voltages at the input terminals equal. Hence the current through the resistor $I_{ref}$ is reduced from $V_o/R_{ref}$ (in the case where $R_{ref}$ is returned to ground) by an amount (y times $V_{ref}/R_{ref}$) which represents the extent to which the input voltage at the second terminal is scaled down by the range scale potentiometer.

Hence, $$I_{ref} = (V_{ref} - y \cdot V_{ref})/R_{ref} \qquad [8]$$

and $$I_{ref} = (1-y) V_{ref}/R_{ref} \qquad [9]$$

Substituting $I_{ref}$ into equation [4] yields:

$$V_o = V_{ref(1-y)} K R_o n/255 \cdot R_{ref} \qquad [10]$$

With the values of $R_{ref}$, $R_o$, and K from above, the expression $KR_o/R_{ref}$ is approximately 1. Hence, equation [10] reduces to:

$$V_o = (1-y) V_{ref} n/255 \qquad [11]$$

Now, in the lower path, the output of the inverter is $-V_{ref}$ times y. Hence, the output ($V_{out}$) of the differential amplifier 20 is:

$$V_{out} = V_o - V_{inv} \qquad [12]$$

where $V_{inv}$ is the voltage output of the inverter 22.

From equations [11] and [12], since $V_{ref} = V_{in}$:

$$V_{out} = [V_{in}(1-y)n/255] - [-V_{in} \cdot y] \qquad [13]$$

or $$V_{out} = (V_{in})[(1-y)n/255 + y] \qquad [14]$$

For n=255, equation [14] reduces to:

$$V_{out} = V_{in} \qquad [15]$$

and for n=0, $$V_{out} = y V_{in} \qquad [16]$$

Hence, the output voltage range varies from maximum to some fraction of maximum as y is varied from 0 to 1.

Figure 2:
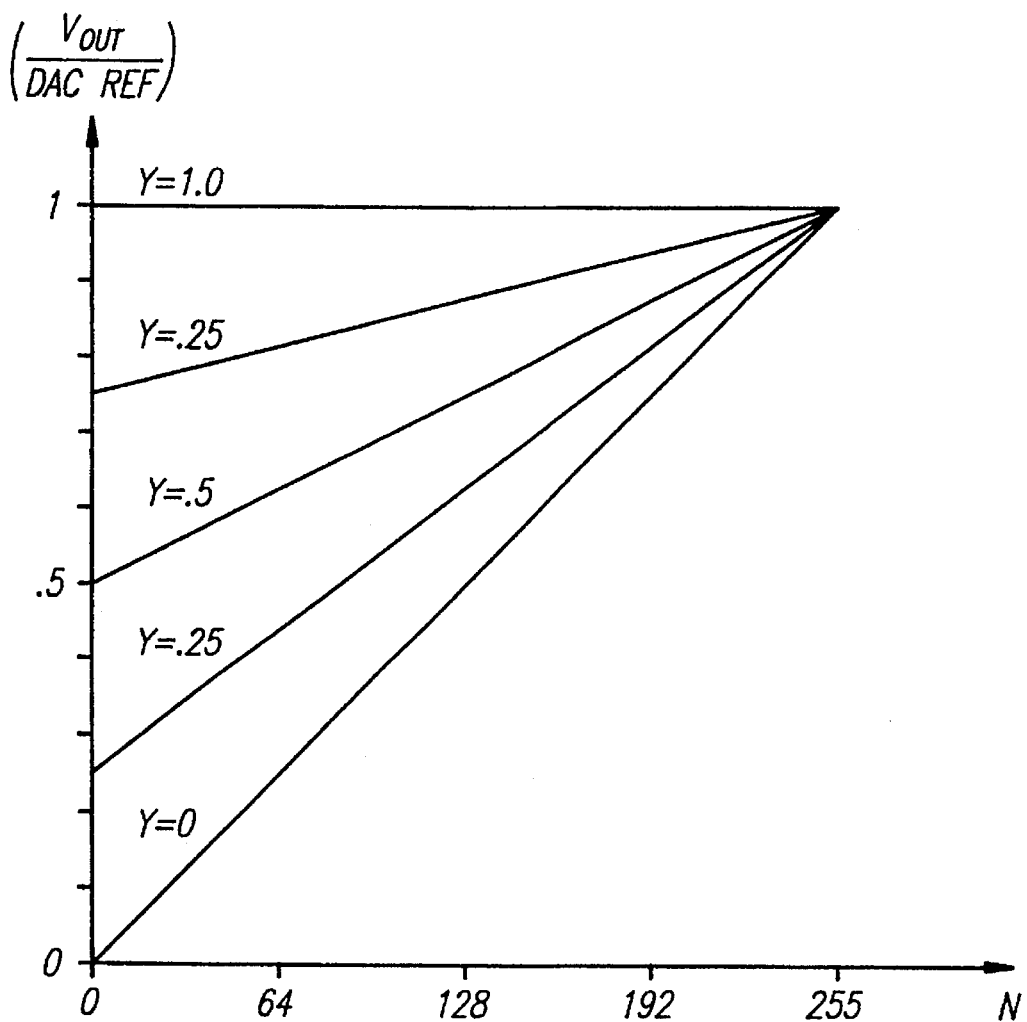
FIG. 2 is a graph of a family of lines showing the transfer function of the DAC as a function of the fractional setting of the range scale potentiometer (y) and the pixel correction value (n).

FIG. 2 is a graph of a family of lines showing the transfer function of the DAC 12 as a function of the fractional setting of the range scale potentiometer (y) and the pixel correction value (n). Note that the maximum gain is unity and the minimum gain is y.

The present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and Accordingly,

What is claimed is:

1. A high resolution gain response correction circuit for correcting a first analog signal in a gain control circuit, said gain response correction circuit including:

potentiometer means for providing a scaled signal in response to said first analog signal;

first means for providing a second analog signal in response to said first analog signal and said scaled signal; and second means for adding said scaled signal to said second analog signal, an output of said second means providing a corrected first analog signal to said gain control circuit.

2. The invention of claim 1 wherein said first means includes a digital to analog converter having an n-bit digital input for receiving a digital signal representing local gain correction values for said first analog signal.

3. The invention of claim 2 wherein said first means further includes means for adjusting the amplitude of said second analog signal in response to the digital signal.

4. The invention of claim 3 further including means for providing said digital signal.

5. The invention of claim 1 wherein said second means includes a differential amplifier and wherein one output of said first means provides a first input to said differential amplifier.

6. The invention of claim 5 further including a first buffer for buffering the scaled signal from said potentiometer means.

7. The invention of claim 6 wherein said second means further includes an inverter coupled between an output of said potentiometer means and a second input of said differential amplifier.

8. A high resolution response correction circuit comprising:

a gain control circuit for providing a first analog signal;

potentiometer means for providing a scaled signal proportional to said first analog signal;

a digital to analog converter for providing a second analog signal in response to said first analog signal, said scaled signal and a digital signal;

means for providing the digital signal, said digital signal providing gain correction values for said first analog signal; and means for adding the output of the potentiometer means to said second analog signal.

9. A method for correcting the gain response of a first analog signal, comprising the steps of:

generating a reference signal from said first analog signal;

generating a bias signal in response to said first analog signal;

decreasing the reference signal when bias signal is increased and increasing the reference signal when the bias signal is decreased;

generating a second analog signal in response to the reference signal and an n-bit digital signal; and adding the bias signal to the second analog signal to provide a corrected first analog signal.

* * * * *